(No Model.)
T. A. & A. A. CONNOLLY.
GAS CONVEYING APPARATUS.
No. 331,686. Patented Dec. 1, 1885.
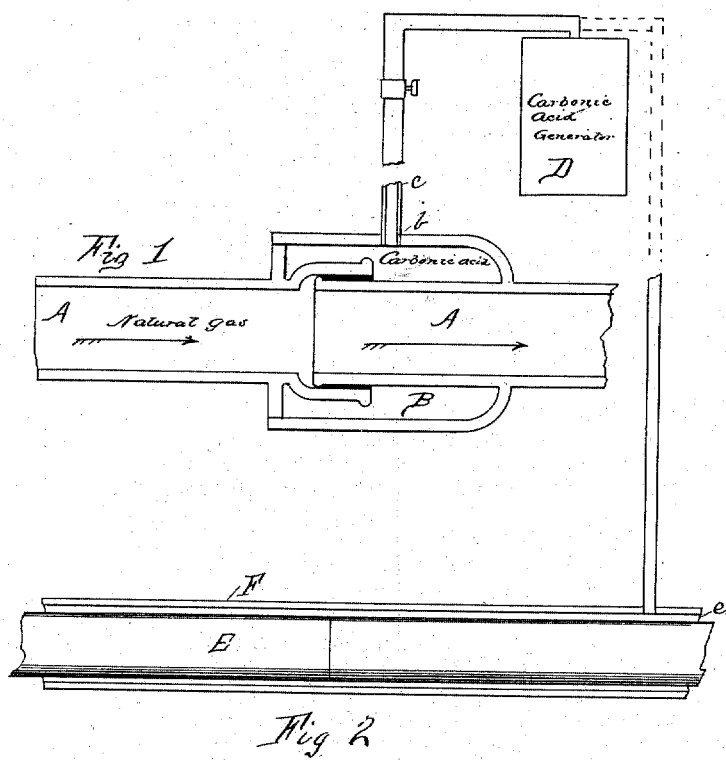

UNITED STATES PATENT OFFICE.

THOMAS A. CONNOLLY AND ANTHONY A. CONNOLLY, OF WASHINGTON, D. C.

GAS-CONVEYING APPARATUS.

SPECIFICATION forming part of Letters Patent No. 331,686, dated December 1, 1885.

Application filed October 22, 1885. Serial No. 180,612. (No model.)

*To all whom it may concern:*

Be it known that we, THOMAS A. CONNOLLY and ANTHONY A. CONNOLLY, citizens of the United States, residing at Washington, in the District of Columbia, have invented certain new and useful Improvements in Gas-Conveying Systems; and we do hereby declare the following to be a full, clear, and exact description of the invention, such will enable others skilled in the art to which it appertains to make and use the same.

Our invention has relation to systems for conveying gas, and has particular reference to the conveyance of natural gas.

The object of our invention is to prevent, as far as may be praticable, the leakage or escape of the gas from the joints or couplings of the gas-conduits, and to provide means whereby any leakage that may occur shall be easily detected.

Our invention consists, first, in the employment as a sealing medium for the joints and other parts of a gas-conduit or conveying system of a gas or gaseous body of a greater density and specific gravity than the natural gas; second, in the employment as a filling for joint-casings and other appropriate portions of a gas-conveying system of a gas or vapor having a distinct and easily perceptible odor, such odor being that of the vaporous filling itself or an odor artificially imparted to it.

Our invention is susceptible of being carried into effect in a great variety of ways.

In the accompanying drawings we have illustrated two of the many ways in which our gas seal may be employed.

Referring to Figure 1, A A represent the adjacent ends of two sections of a gas-conduit, and B the surrounding chamber, having inlet *b* for the pipe *c*, which leads from the tank or generator D. This chamber B may be in continuous communication with the tank D, so that any leakage of the sealing-gas may be replaced from the tank or generator.

Fig. 2 shows a method of applying our gas seal in conduits wherein two pipes are used, one being inclosed within the other. In the latter case the entire space *e* between the conduits E is filled with the sealing-gas.

While we have shown both the chamber B and the space *e* as being in constant communication with the supply of sealing-gas, we do confine ourselves to that form of sealing, as it is very evident that the sealing-gas may be supplied to the chambers or spaces in sufficient quantity and the supply be then cut off, the chambers or casings being closed to prevent the escape of said sealing-gas.

The gas or vapor seal may be applied to many of the forms of joint-casings or conduit-inclosing pipes by admitting it to the interior of the same under pressure through any of the inlets thereto. The sealing-gas should be under a pressure greater than the normal pressure of the natural gas, and said sealing-gas should be of such density that it will not tend to pass through the joints of the conduit, although the latter may be incapable of preventing the passage or escape of the very light and highly penetrative natural gas. The sealing-gas should also be of greater specific gravity and density than the atmospheric air, so as to have little, if any, tendency to rise or escape from its confines.

As a sealing-gas we prefer to employ carbonic acid; but any other or equivalent gas or vapor adapted for the purpose may be employed.

The sealing-gas will serve to greatly, if not totally, prevent the escape of the natural gas through the joints or seams, and, being under a greater pressure than the natural gas, will prevent the diffusion of the latter, while, should any of the latter escape, its admixture with the sealing-gas will deprive it of its high explosive or combustible properties.

The sealing-gas may be an odorous gas, in which event any leakage from the casing under excessive pressure of the natural gas or from other causes will be detected by the odor of the sealing-gas necessarily escaping therewith. In this way many of the dangerous explosions which have already taken place, occurring from the presence of odorless natural gas, are prevented. Should the sealing-gas be itself naturally inodorous, it may be mixed with or charged with odorous mediums in the form of vapor, such as sulphureted hydrogen.

We are aware of the fact that in a great number of the pipe-joint couplings now in use the space inclosed between the collars and the ends of the pipes contains atmospheric air at the ordinary pressure, and we do not, therefore, include air as a sealing-gas unless it be at a greater degree of pressure than the atmosphere.

What we claim as our invention is—

1. In systems for the conveyance of gas, a seal for the joints of conduits or pipes, consisting of a fixed gas or vapor of greater specific gravity than air, inclosed within a chamber surrounding the conduit or pipe.

2. In systems for the conveyance of gas, a seal for the joints of connected conduit sections or pipes, consisting of a fixed gas or vapor under pressure, inclosed in a chamber surrounding or adjacent to the joint-seams.

3. In systems for the conveyance of gas, a seal consisting of a fixed gas or vapor under pressure and of greater density than the conveyed gas, contained in a chamber or casing surrounding or adjacent to the joint-seam.

4. In systems for the conveyance of gas, the combination, with the conduit or pipe sections, of chambers or chambered casings surrounding the pipes or conduits, and containing a fixed gas or vapor of greater density than air.

5. In systems for the conveyance of practically inodorous gas, the combination, with the sections of conduit or pipe, of chambers or chambered casings surrounding the former and containing a sealing gas or vapor having commingled therewith an odorous gas, substantially as described.

6. A seal for conduits or pipes or joints, consisting of a fixed gas or vapor of greater specific gravity than air, contained within a closed chamber or chambered casing encircling said joints or adjacent thereto.

7. The combination, with a conduit pipe or conveyer for gas, having packed or mechanically-close joints, of a seal consisting of a gas-tight chamber or casing containing a fixed gas or vapor of greater specific gravity than air.

8. The combination, with a gas conduit or pipe, of chambered casings or chambers adjacent to the joints, and adapted for the reception of a sealing gas or vapor, with a gas generator or tank for supplying said sealing gas or vapor to said chambers.

9. A gas-conduit having its jointed sections sealed by a fixed gas or vapor of greater density and pressure than the gas within the conduit, said fixed and sealing gas being inclosed within a casing or casings.

10. A seal for natural-gas conduits, consisting of carbonic-acid gas inclosed in a chamber or casing formed within the joint-couplings or around the joints.

In testimony whereof we affix our signatures in presence of two witnesses.

THOMAS A. CONNOLLY.
ANTHONY A. CONNOLLY.

Witnesses:
H. A. HALL,
J. H. STENWOOD.

Corrections in Letters Patent No. 331,686.

It is hereby certified that in Letters Patent No. 331,686, granted December 1, 1885, upon the application of Thomas A. Connolly and Anthony A. Connolly, of Washington, District of Columbia, for an improvement in "Gas Conveying Apparatus," errors appear in the printed specification requiring correction as follows: In line 50, page 1, the reference letter F should be inserted after the reference letter E, and at the end of line 53, same page, after the word "do" insert the word *not;* and that the said Letters Patent should be read with these corrections therein that the same may conform to the record of the case in the Patent Office.

Signed, countersigned, and sealed this 8th day of December, A. D. 1885.

[SEAL.]

H. L. MULDROW,
*Acting Secretary of the Interior.*

Countersigned:
   M. V. MONTGOMERY,
      *Commissioner of Patents.*